United States Patent
Iiyama et al.

(10) Patent No.: US 6,489,883 B1
(45) Date of Patent: Dec. 3, 2002

(54) NON-CONTACT DATA CARRIER SYSTEM

(75) Inventors: Keiichi Iiyama, Hirakata (JP);
Nobuyoshi Asaka, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/066,918

(22) Filed: Apr. 27, 1998

(30) Foreign Application Priority Data

Apr. 30, 1997 (JP) .............................. 9-112202
Aug. 29, 1997 (JP) .............................. 9-234324

(51) Int. Cl.⁷ .............................................. H04B 1/00
(52) U.S. Cl. ................ 340/5.1; 340/10.34; 340/825.69; 370/10.2
(58) Field of Search ................. 307/10.2, 104, 307/116, 652; 340/825.54, 825.31, 825.69, 825.72, 505, 510, 10.1, 10.33, 10.2, 10.34, 10.3, 10.52, 5.2, 5.65, 5.61, 426, 5.72; 343/711, 712

(56) References Cited

U.S. PATENT DOCUMENTS

| | | | | |
|---|---|---|---|---|
| 4,591,854 A | * | 5/1986 | Robinson | 340/5.65 |
| 4,672,375 A | * | 6/1987 | Mochida et al. | 340/825.31 |
| 4,737,784 A | | 4/1988 | Hirano | |
| 4,758,735 A | * | 7/1988 | Ingraham | 307/116 |
| 4,873,530 A | * | 10/1989 | Takeuchi et al. | 343/711 |
| 5,317,309 A | | 5/1994 | Vercellotti et al. | 340/10.5 |
| 5,519,386 A | | 5/1996 | Tobergte | 340/10.34 |
| 5,603,537 A | * | 2/1997 | Amano et al. | 292/201 |
| 5,790,015 A | * | 8/1998 | Iitsuka | 340/426 |
| 5,973,611 A | * | 10/1999 | Kulha et al. | 340/5.62 |
| 6,011,320 A | * | 1/2000 | Miyamoto et al. | 307/10.2 |

FOREIGN PATENT DOCUMENTS

| | | | |
|---|---|---|---|
| EP | 0 628 456 A2 | 12/1994 | |
| EP | 0697 680 A2 | 2/1996 | |
| GB | 2 292 866 A | 6/1996 | |
| GB | 2292866 | * 6/1996 | ............ G06K/7/08 |
| JP | 58151722 A | 9/1983 | |
| JP | 58154080 A | 9/1983 | |
| JP | 58154081 A | 9/1983 | |
| JP | 58154082 A | 9/1983 | |

* cited by examiner

Primary Examiner—Michael Horabik
Assistant Examiner—William L Bangachon
(74) Attorney, Agent, or Firm—Akin Gump Strauss Hauer & Feld, L.L.P.

(57) ABSTRACT

A non-contact data carrier includes a battery, an electric-supply circuit for rectifying a received carrier signal and generating power, and an electric-supply switching circuit for comparing the voltage of the battery and the voltage generated by the electric-supply circuit and selecting either one of the voltages. When the battery can supply power, long-distance communication can be performed by supplying power from the battery. In case of battery exhaustion, power is supplied from the electric-supply circuit which receives a stronger carrier signal by using the non-contact IC card in the proximity of a question unit and rectifies the carrier signal, so that the function of the non-contact data carrier is maintained.

2 Claims, 8 Drawing Sheets

NON-CONTACT DATA CARRIER SYSTEM

BACKGROUND OF THE INVENTION

The present invention relates to a non-contact data carrier system, for communicating by use of a radio wave, for uses for verification of various IDs, financial trading and control of a door lock of a car, and a non-contact data carrier used for the same.

A non-contact IC card as an example of the non-contact data carrier has a convenience that it is unnecessary to insert the non-contact IC card into a slot of a reader/writer as well as features of normal IC cards having a large storage capacity and a high-degree security function. Therefore, the non-contact IC card is a product of which a great market can be expected not only as a commuter ticket of public transportation and a ticket for a ski lift but also as a room entry/exit card for opening or closing a door and a card for electronic money. Such a non-contact IC card performs information transmission and reception with a question unit by use of a medium such as a radio wave. Power necessary for operation of a control circuit and a memory of the non-contact IC card is obtained from a battery incorporated in the card or by rectifying, by a radio wave transmitted from the question unit, an induced current generated due to mutual induction of a coil provided in the non-contact IC card.

Figure 7:
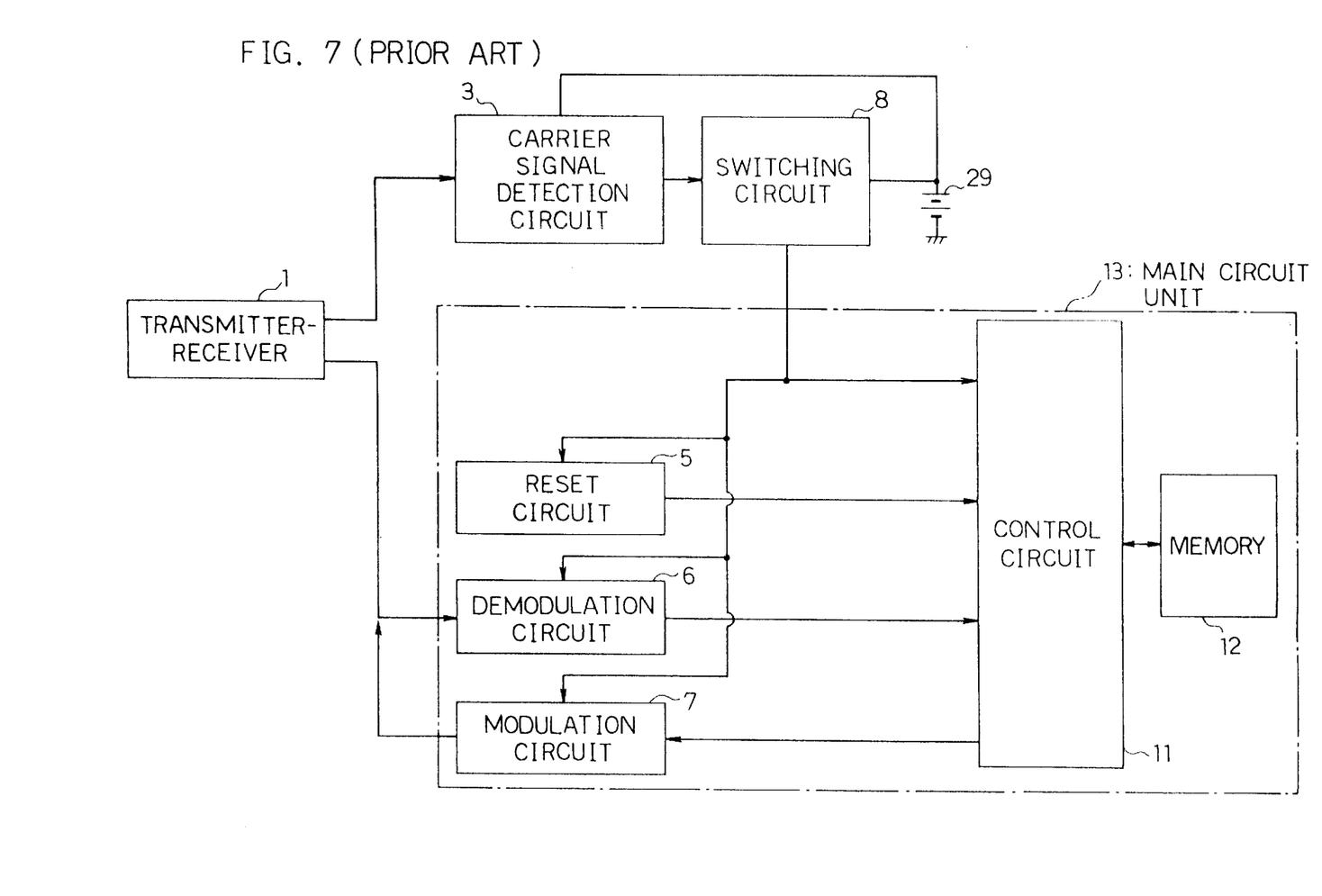
FIG. 7 is the block diagram showing the circuit configuration of the conventional non-contact IC card.

FIG. 7 is a block diagram showing the configuration of a conventional non-contact IC card which operates on power supplied from a battery 29. A main circuit unit 13 of the non-contact IC card comprises a reset circuit 5, a demodulation circuit 6, a modulation circuit 7 and a memory 12. The main circuit unit 13 further comprises a control circuit 11 for controlling the above-mentioned circuits and performing reading from and writing to the memory 12 in accordance with the contents of a signal transmitted from a question unit (not shown). A transmitter-receiver 1 comprising an antenna and a tuning circuit (both are not shown) receives a radio signal transmitted from the question unit. A carrier signal detection circuit 3 compares the level of the received signal and a reference level preset in the carrier signal detection circuit 3. When the level of the received signal is higher than the reference level, a switching circuit 8 goes into on state, so that power is supplied from a battery 29 to the main circuit unit 13. As a result, the non-contact IC card operates. When the level of the received signal is not higher than the reference level, the non-contact IC card does not operate and goes into sleep state which is the state only to receive and detect a signal which will be again transmitted from the question unit.

In the non-contact IC card having the switching circuit 8, power is supplied to the circuit components only when a carrier signal from the question unit is detected. Therefore, when no carrier signal is transmitted from the question unit, that is, when information transmission and reception is not performed between the non-contact IC card and the question unit, only the carrier signal detection circuit 3 consumes power, so that power consumption is reduced.

The above-mentioned non-contact IC card uses an internal battery 29 as the power source and the power necessary for operation of the non-contact IC card is supplied from the battery 29. On the other hand, in a non-contact IC card which uses induced electromotive force generated at a coil incorporated in the non-contact IC card, rectified induced-electromotive-force is stored and the stored force is used for operation of the non-contact IC card. Therefore, the induced electromotive force generated in the coil decreases correspondingly to increase of the distance between the non-contact IC card and the question unit. In order to prevent the induced electromotive force from decreasing, it is necessary to use the non-contact IC card in the proximity of the question unit at the time of communication.

That is, in the latter non-contact IC card, the longer the distance between the question unit and the non-contact card is, the lower the value of the induced electromotive force is, so that it is difficult to ensure the power necessary for operation. On the contrary, in the former non-contact IC card, since stable power is supplied from the battery 29, long-distance communication can be performed.

Generally, the convenience of the non-contact IC card is influenced by a communication-possible distance between the question unit and the non-contact IC card. By increasing the communication distance between the non-contact IC card and the question unit, the non-contact IC card can be used at a position remote from the question unit, and thus the convenience is improved. The non-contact IC card in which power is supplied from a battery is excellent in convenience because a long communication distance can be ensured compared with the non-contact IC card using the induced electromotive force.

However, since the battery is required for operation, the non-contact IC card becomes inoperable when the capacity of the battery is low, that is, when the battery is exhausted. As described above, when the non-contact IC card is in sleep state, only the carrier signal detection circuit 3 is actuated for detecting a signal from the question unit. Therefore the power consumption is reduced. However, slight power is still consumed. Consequently, the battery is exhausted when the non-contact IC card is used for a long time. Normally, the non-contact IC card does not have means for displaying the remaining capacity of the internal battery, so that it is impossible for the user of the non-contact IC card to predict battery exhaustion. For this reason, the non-contact IC card is hardly used for important work or for recording important data.

When the battery is exhausted, the use of the non-contact IC card cannot be continued unless a replacement battery is at hand. Even if a battery is available, a tool such as a screwdriver is necessary for battery replacement, so that it is very difficult to replace the battery in a short time to use again the non-contact IC card.

An object of the present invention is to prevent a trouble caused by battery exhaustion of the non-contact IC card while maintaining the convenience that long-distance communication can be performed.

Another example of use of a conventional non-contact data carrier will be described hereinafter.

Figure 8:
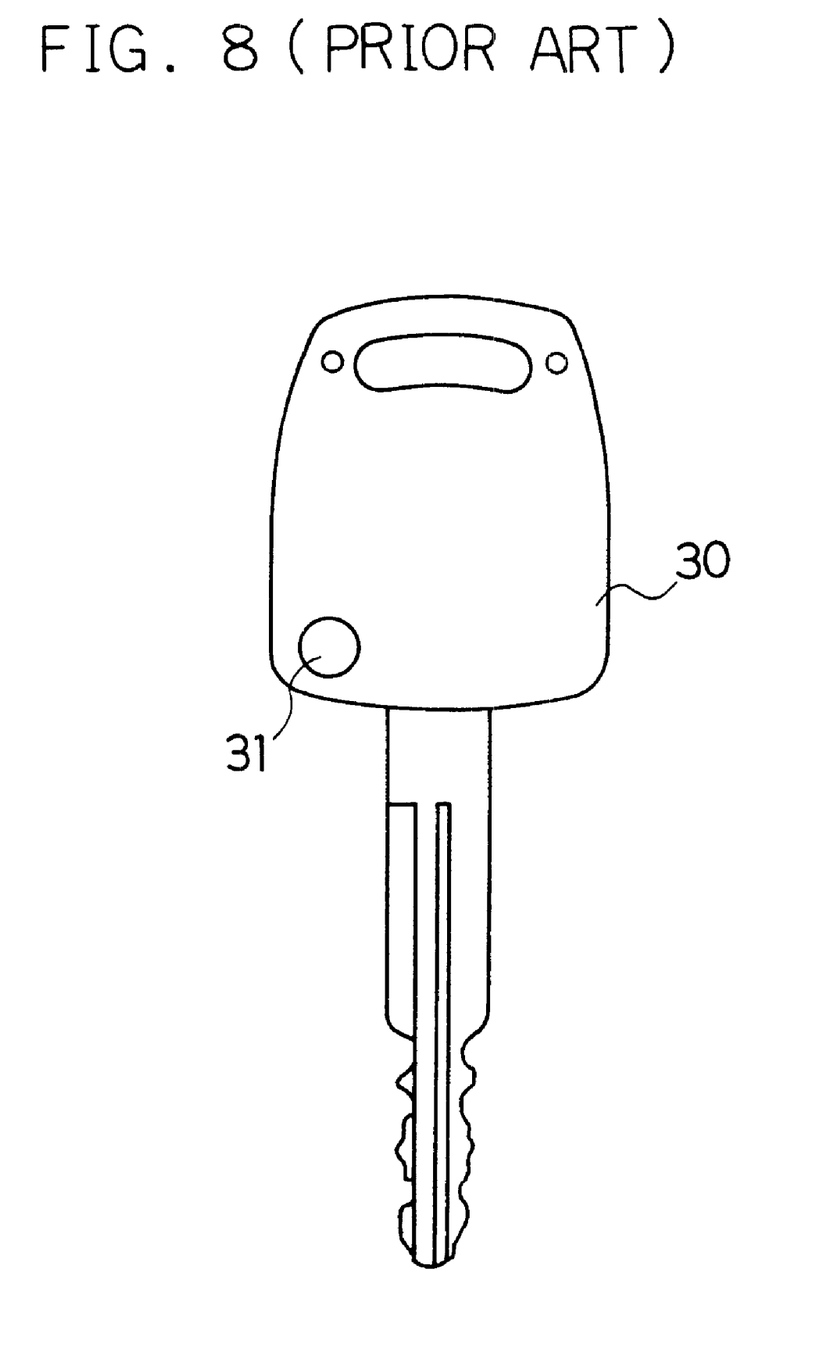
FIG. 8 is the side view showing the key terminal used for the conventional keyless entry system.

Conventionally, a door lock of a car employs a system for locking or unlocking the door by inserting a key into a key cylinder provided at the door and turning the key either leftward or rightward. In recent years, in order to simplify such locking or unlocking by use of a key, a wireless door lock system, namely, so-called keyless entry system has become widespread for locking and unlocking not only a door but also a trunk lid without the use of the key. In the keyless entry system, a locking or unlocking instruction is transmitted to a locking device for the door or the trunk lid from a position remote from it. The locking or unlocking instruction is given by use of light or a radio wave. For example, by pressing a push button 31 provided on a key terminal 30 as shown in FIG. 8, a key ID number is transmitted to the locking device of a vehicle. The key ID number is verified by a terminal device mounted in the vehicle. As a result of the verification, when the key ID number coincides with the key ID number of the vehicle, door locking or unlocking is performed. According to this configuration, even at nighttime or in an indoor parking lot where the keyhole of the key cylinder is not easily found because it is dark, door locking or unlocking can be easily performed without the key being inserted into the key cylinder. Recently, many vehicles have employed this system for the purpose of increasing their added values.

In this keyless entry system, it is necessary to take out the key terminal 30 and transmit the key ID number by pressing the push button 31 toward the vehicle every time door locking or unlocking is performed. Although it is unnecessary to look for the keyhole in order to insert the key into the key cylinder, when the user's both hands are taken up by baggage or when the user puts up an umbrella at the time of rain, it is necessary for the user to put down the baggage or the umbrella before taking out the key terminal 30 and pressing the push button 31 to perform key locking or unlocking. Thus, the conventional keyless entry system is still inconvenient.

Data of the key ID number used in the above-described system is transmitted from the key terminal to the vehicle-mounted terminal device as a coded binary signal. Therefore, the key ID number data can be fraudulently obtained by disassembling the key terminal and analyzing it in detail. Further, the coded signal, which is comparatively simple, can be read by a cryptoanalysis apparatus. The key ID number can also be obtained by replicating the signal. The terminal device controlling door lock condition determines that an access is made by an authorized key terminal when the received key ID number coincides with the key ID number of the vehicle, and locking or unlocking is performed. It is difficult to adopt a configuration for denying an access from a key terminal transmitting a fraudulently obtained ID number. Thus, the conventional keyless entry system is defective also in security.

The key terminal incorporates a battery and uses it as the power source when transmitting the key ID number data. When the battery capacity is low, that is, when the battery is exhausted, the Key ID number data cannot be transmitted from the key terminal. Under such a state, door locking or unlocking by the keyless entry system cannot be performed, so that it is necessary to insert the key into the key cylinder to lock or unlock in a manner similar to the conventional door lock.

The present invention is intended for solving the above-described conventional problems, and provides a non-contact data carrier system applied to control of a door lock of a car in which security and convenience of the keyless entry system are maintained without use of a key to lock or unlock the door.

BRIEF SUMMARY OF THE INVENTION

A non-contact data carrier of the present invention comprises transmission-reception means for receiving a carrier signal from a question unit and transmitting transmission data to the question unit, carrier signal detection means for detecting the carrier signal, a demodulation circuit for demodulating the carrier signal, a modulation circuit for modulating the transmission data to be transmitted to the question unit, a memory for holding data, and a control circuit for controlling the modulation circuit and the memory, the control circuit receiving an output of the demodulation circuit. The non-contact data carrier further comprises switching means for supplying power of an internal battery to a main circuit unit when the carrier signal is detected, electric-supply means for rectifying the carrier signal and generating a voltage, and electric-supply switching means to which an output of the electric-supply means and an output of the switching means are input. The electric-supply switching means compares a voltage value of the battery and a voltage value of the electric-supply means, and switches between the battery and the electric-supply means.

According to the above-described configuration, when the battery is capable of supplying power, power is supplied from the battery, so that long-distance communication is realizable. In case of battery exhaustion, power is supplied by induced electromotive force from the question unit by using the non-contact data carrier in the proximity of the question unit, so that the function of the non-contact data carrier can be maintained.

Moreover, in the non-contact data carrier according to another aspect of the present invention, the level of the carrier signal and a predetermined reference level are compared with each other by the carrier signal detection means. When the level of the carrier signal is higher than the reference level, the switching means goes into on state. When the switching means is in on state, the voltage value of the battery and the value of the voltage generated by the electric-supply means are compared. When the voltage value of the battery is higher than the value of the generated voltage, power of the battery is output to the main circuit unit by the electric-supply switching means.

Moreover, the voltage of the electric-supply means obtained by the received signal and the battery voltage are compared with each other. When the voltage obtained by the received signal is higher than the battery voltage, the power supply from the battery is stopped. When the voltage obtained by the received signal is lower, power is supplied from the battery. Thereby, the power consumption of the battery of the non-contact data carrier is reduced, the battery life is increased.

A non-contact data carrier system of the present invention comprises a non-contact data carrier held by a user of a car, and a question unit mounted in the car. The question unit performs information transmission and reception with the data carrier. The non-contact data carrier stores information such as an ID number therein and performs processing according to information transmitted from the question unit. The question unit comprises switching means for switching operation condition and lock control means for controlling door lock means based on a control signal from the question unit. Since the control of door lock means is performed based on the information such as an ID number stored in the non-contact data carrier, security is maintained.

In the question unit of the non-contact data carrier system of the present invention, an antenna is pasted on a front door of a car, preferably, on a driver side window pane, or an antenna is printed on a window pane. Communication with the non-contact data carrier is performed through the antenna. The switching means for switching operation condition of the question unit is disposed in the proximity of the antenna and comprises a touch switch circuit and a lock control unit. A sensor of a touch switch is provided on the door lever of the driver's seat side, and communication between the non-contact data carrier and the question unit can be performed only when the touch switch is on. Door locking and unlocking can be performed only by the door lever being touched by the user holding the non-contact data carrier. As a result, the user's convenience greatly improves.

Further, by providing the timer circuit in the switching means, even when on state of the touch switch is continued for a long time by mischief and the like, the question unit can be brought into wait state after a predetermined time period has elapsed according to counting by the timer circuit. Thereby, not only power consumption due to continuous transmission of signal from the question unit can be reduced but also frequent switching of door lock condition, that is, frequent repetition of locking and unlocking can be prevented.

In the non-contact data carrier system according to another aspect of the present invention, when the user brings the switching means into on state, the question unit transmits a signal to the non-contact data carrier. The question unit determines the contents of the signal returned from the non-contact data carrier and performs the control of the door lock by the control means. The signal returned from the non-contact data carrier is produced based on information transmitted from the question unit and the ID information stored in the non-contact data carrier. The returned signal includes information on the question unit, therefore it is difficult to obtain the data necessary for door lock control even if attempt is made to analyze the internal structure of the non-contact data carrier. Thus, the non-contact data carrier system provides high confidentiality.

DETAILED DESCRIPTION OF THE INVENTION

Hereinafter, preferred embodiments of the present invention will be described with reference to FIG. 1 to FIG. 6.
[First Embodiment]
A non-contact IC card according to a first embodiment of the non-contact data carrier system of the present invention will be described with reference to FIG. 1 to FIG. 3.

Figure 1:
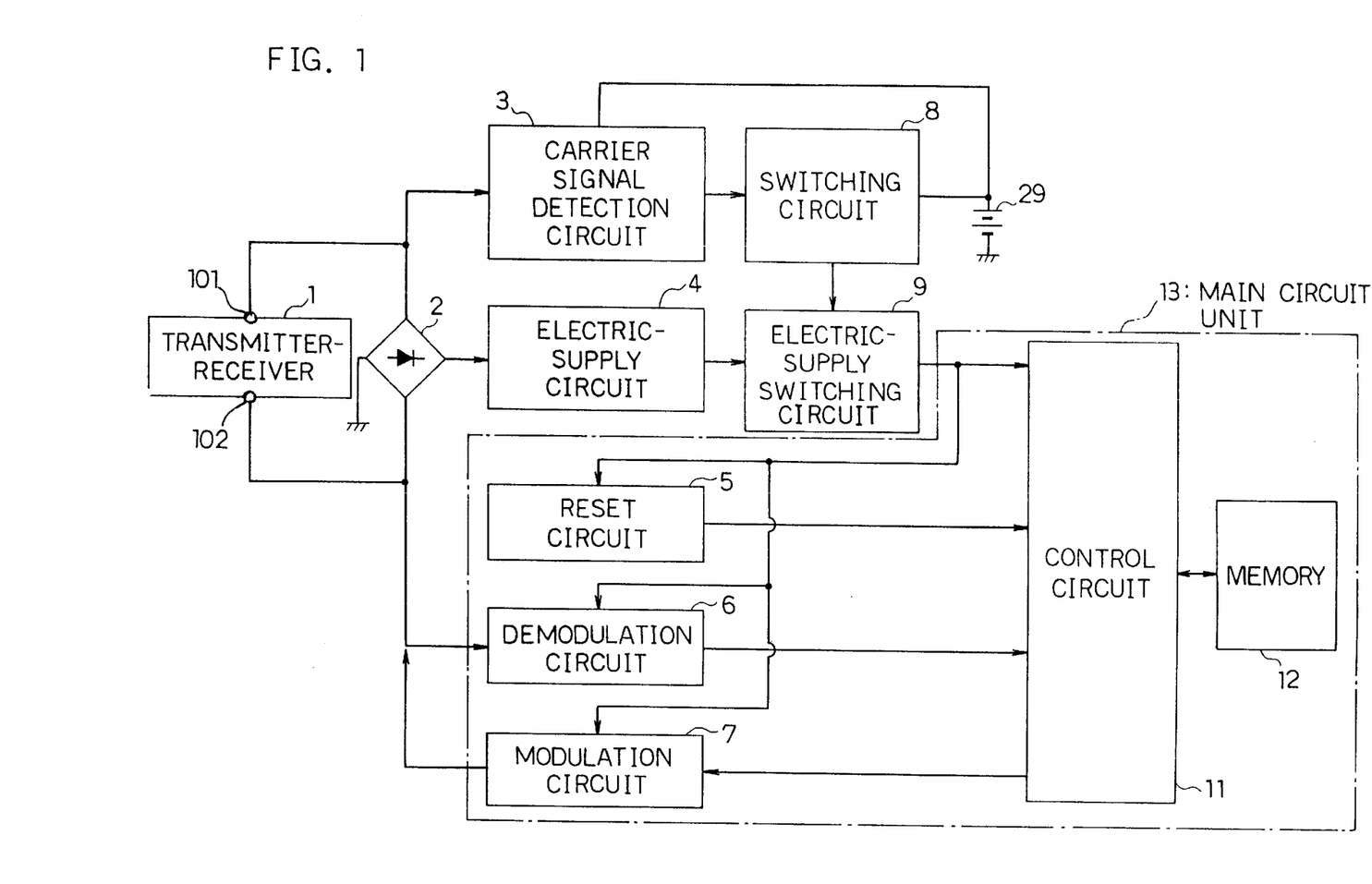
FIG. 1 is a block diagram showing a circuit configuration of a non-contact IC card according to a first embodiment of a non-contact data carrier system of the present invention.

FIG. 1 is a block diagram of the non-contact IC card according to this embodiment. In FIG. 1, the non-contact IC card comprises a transmitter-receiver 1 for receiving a carrier signal from a question unit (not shown) provided in a fixed apparatus of the non-contact data carrier system and for returning to the question unit a result of processing performed by the non-contact IC card side on the information transmitted from the question unit. The transmitter-receiver 1 has, for example, an antenna and a tuning circuit (not shown). The non-contact IC card further comprises a rectifier 2 connected to terminals 101, 102 of the transmitter-receiver 1 for rectifying the received carrier signal, and a carrier signal detection circuit 3 for comparing the output signal level of the transmitter-receiver 1 with a predetermined reference level. The non-contact IC card further comprises a switching circuit 8 for supplying power from a battery 29 to a main circuit unit 13 in accordance with a result of the comparison, and an electric-supply circuit 4 connected to the rectifier 2 for storing the rectified direct-current power, converting it into a voltage to be supplied to the main circuit unit 13 and outputting the voltage. The non-contact IC card comprises an electric-supply switching circuit 9 for comparing the output voltage of the electric-supply circuit 4 and the output voltage of the battery 29 supplied by way of the switching circuit 8, and for switching in accordance with the comparison result the power source which supplies power to the main circuit unit 13.

The main circuit unit 13 comprises a reset circuit 5 for initializing the circuit by resetting it when a voltage supplied from the electric-supply switching circuit 9 reaches a predetermined value at the time of rise of the voltage. The main circuit unit 13 further comprises a demodulation circuit 6 for demodulating a received signal, a modulation circuit 7 for modulating transmission data, and a memory 12 for holding data. These circuit blocks are connected to a control circuit 11.

Subsequently, an operation of the non-contact IC card will be described in detail in accordance with the flow of the signal transmitted from the question unit. The carrier signal from the question unit is received by the transmitter-receiver 1 comprising the antenna. The received carrier signal is input to the carrier signal detection circuit 3, and the level of the carrier signal is compared with a reference level that is preset in the detection circuit 3. When the level of the carrier signal is higher than the reference level, the switching circuit 8 goes into on state, so that the voltage of the battery 29 is supplied to the main circuit unit 13. When the supplied voltage reaches a predetermined level, the reset circuit 5 is actuated, so that the non-contact IC card is initialized. The received carrier signal is rectified by the rectifier 2, and is inputted to the electric supply circuit 4. A direct-current voltage is output from the electric supply circuit 4.

The electric-supply switching circuit 9 compares the value of the voltage of the battery 29 supplied by way of the switching circuit 8 and the value of the voltage supplied from the electric-supply circuit 4. When the voltage applied from the battery 29 is higher than the voltage supplied from the electric-supply circuit 4, power is supplied from the battery 29 to the main circuit unit 13 like in the conventional non-contact IC card incorporating a battery. Since the battery 29 outputs a stable voltage, the non-contact IC card can operate even when the question unit is away from the non-contact IC card.

When the voltage of the battery 29 lowers and the value of the voltage input from the electric-supply circuit 4 is higher than the value of the voltage of the battery 29, power is supplied from the electric-supply circuit 4 to the main circuit unit 13 through the electric supply switching circuit 9. According to this configuration, the power supplied from the electric-supply circuit 4 is used to operate the non-contact IC card in the proximity of the question unit so that a strong radio wave is received. Therefore, operation of the use of the non-contact IC card can be continued even when the battery voltage is low, for example, when the power of the battery is exhausted.

The received signal is also supplied to the demodulation circuit 6, so that the data included in the signal are demodulated. The demodulated data are analyzed at the control circuit 11. In accordance with the data, the control circuit 11 performs data-reading from the memory 12 and data-writing to the memory 12. Further, the control circuit 11 produces data to be returned to the question unit and inputs the data to the modulation circuit 7. At the modulation circuit 7, the return data are modulated. The modulated data are transmitted from the transmitter-receiver 1 to the question unit. Communication between the question unit and the non-contact IC card is performed through such a signal flow.

The output voltage of the electric-supply circuit 4 varies according to the distance between the non-contact IC card and the question unit. When the non-contact IC card is close to the question unit, the transmitter-receiver 1 receives a strong radio wave, and therefore the output voltage of the electric-supply circuit 4 is high. When the output voltage of the electric-supply circuit 4 becomes much higher than the voltage of the battery 29, a very high output voltage is applied to the main circuit unit 13 through the electric-supply switching circuit 9, so that there is a possibility that devices in the main circuit unit 13 are damaged. To prevent such damage, the electric-supply circuit 4 has a part for safely controlling the voltage output to the electric-supply switching circuit 9.

In the case that the voltage supplied from the electric-supply circuit 4 reaches a voltage value necessary for driving the non-contact IC card, power from the electric-supply circuit 4 may be supplied to the main circuit unit 13 instead of power from the battery 29. When the non-contact IC card is close to the question unit, the output voltage of the electric-supply circuit 4 is high. In this case, the electric-supply switching circuit 9 switches the power source from the battery 29 to the electric-supply circuit 4. According to this configuration, the internal battery can be effectively used, so that the power consumption of the battery can be saved. Further, in a writing operation to the memory 12 at which the power consumption increases and in transitional state where the power source is switched between the electric-supply circuit 4 and the battery 29, power is immediately supplied from the battery 29 when the output voltage of the electric-supply circuit 4 lowers. Therefore, reliability is improved in important processing such as writing to a memory.

The carrier signal detection circuit 3, switching circuit 8 and electric-supply switching circuit 9 included in the non-contact IC card of the present invention may be formed on a semiconductor chip constituting the main circuit unit 13. Operation of these circuits can be realized by control by a microcomputer.

Figure 2:
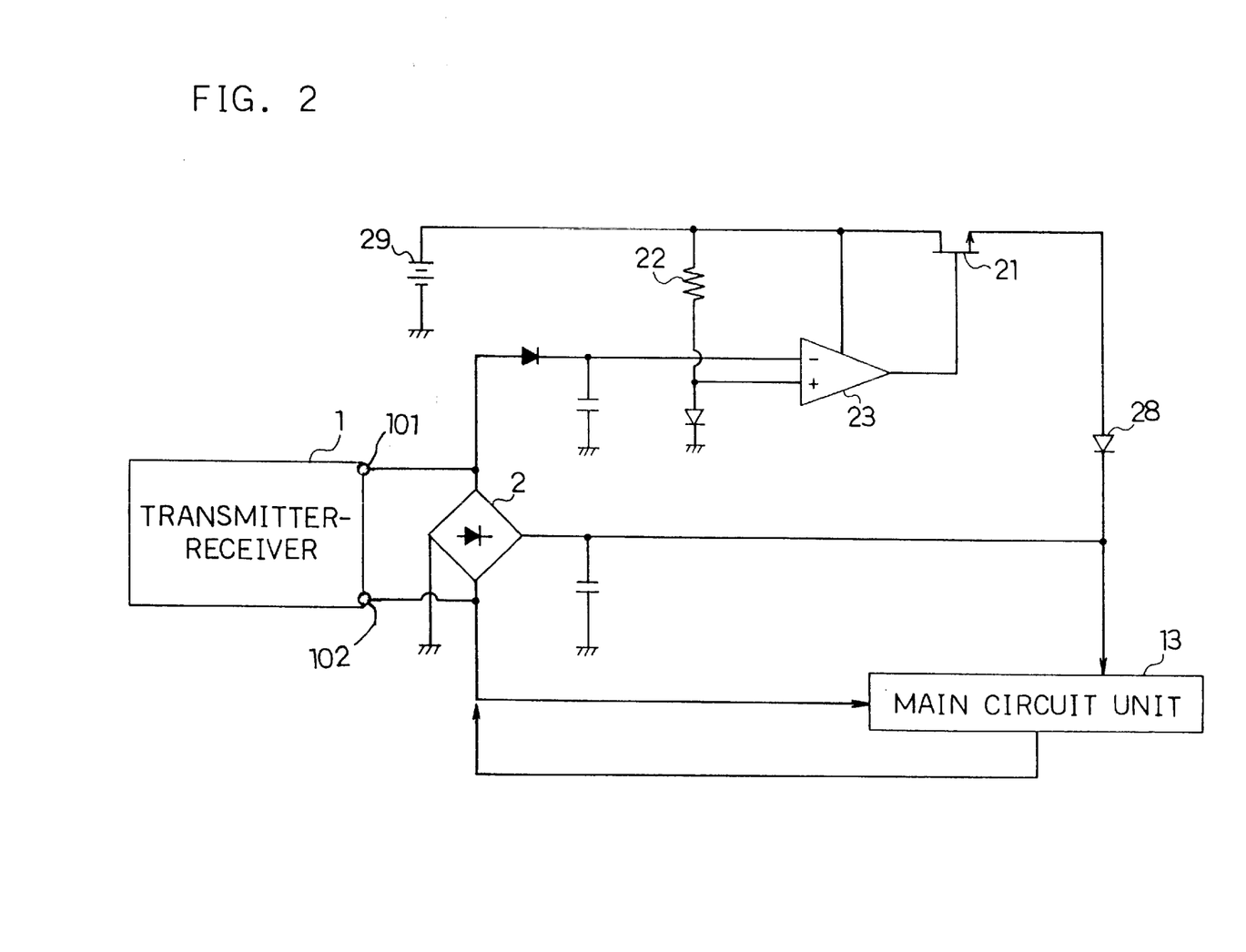
FIG. 2 is a circuit diagram showing a concrete example of the non-contact IC card according to the first embodiment of the present invention.

FIG. 2 shows a concrete example for realizing the carrier signal detection circuit 3, the switching circuit 8 and the electric-supply switching circuit 9 in simpler circuit configurations in order to reduce the cost and the size of the circuit components incorporated in the non-contact IC card. This example will hereinafter be described in comparison with FIG. 1.

In FIG. 2, the carrier signal detection circuit 3 of FIG. 1 comprises a low-power-consumption comparator 23. The switching circuit 8 of FIG. 1 comprises a FET (field effect transistor) 21, and the electric-supply switching circuit 9 comprises a diode 28. To the two input terminals of the comparator 23, the voltage of the signal rectified by the rectifier 2 and the voltage from the battery 29 are input. These voltages are compared by the comparator 23. By adjusting the value of a resistor 22 connected across the positive output of the battery 29 and the noninverting input terminal of the comparator 23, the level of the voltage inverted by the comparator 23 is set, so that a signal level to activate the non-contact IC card is decided. The output terminal of the comparator 23 is connected to the gate of the FET 21. When the output terminal is at high level, the FET 21 turns ON. At this time, power of the battery 29 is supplied to a main circuit unit 13 which is similar to that of FIG. 1. In the case that the electric-supply switching circuit 9 of FIG. 1 comprises the diode 28 like in FIG. 2, the set voltage for switching is a value obtained by subtracting the forward voltage of the diode 28 from the voltage of the battery 29.

Figure 3:
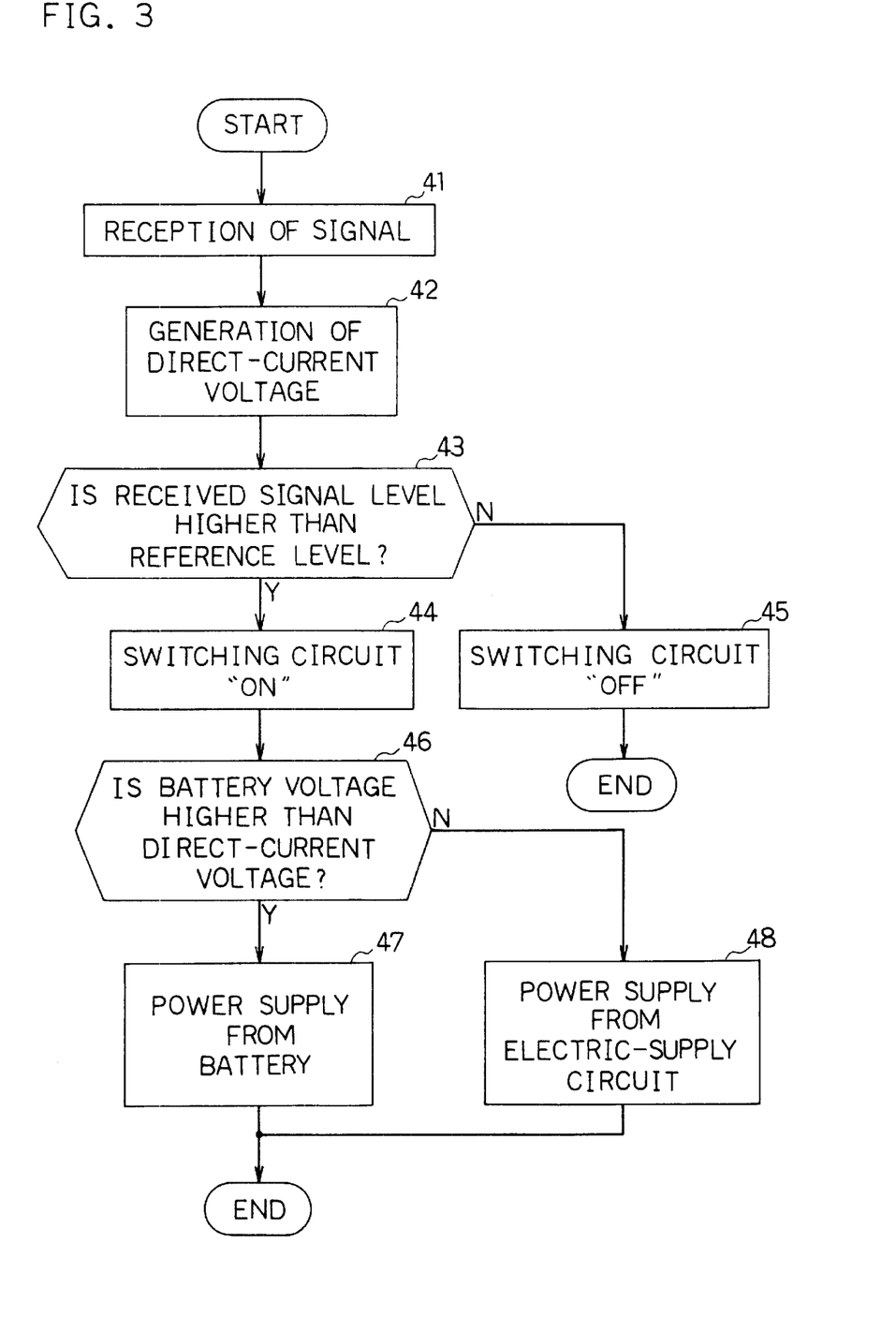
FIG. 3 is a flowchart showing an operation of the non-contact IC card according to the first embodiment of the present invention.

FIG. 3 is a flowchart of signal level comparison operation performed in the non-contact IC card of the present invention shown in FIG. 1. The signal received at step 41 is converted into a direct-current voltage at step 42 and compared with the preset reference level by the carrier signal detection circuit 3 (step 43). When the level of the received signal is higher than the reference level, the switching circuit 8 turns ON at step 44 and the process proceeds to the next step 46. When the level of the signal is lower than the reference level, the switching circuit 8 stays in OFF state as shown at step 45, so that the non-contact IC card goes into sleep state. Thereafter, the power is supplied only when there is a call from the question unit.

Then, at step 46, the power source for operation of the non-contact IC card is decided. The direct-current voltage obtained by rectifying the received signal is compared with the output voltage of the battery 29. When the output voltage of the battery 29 is higher, the electric-supply path is switched to that of the battery 29, so that power from the battery 29 is supplied to the main circuit unit 13 (step 47). When the output voltage from the electric-supply circuit 4 is equal to or higher than the output voltage of the battery 29, the electric-supply switching circuit 9 switches the power supply path to that of the electric-supply circuit 4. This stops the power supply from the battery 29, so that the non-contact IC card is operated by the power supplied from the electric-supply circuit 4 (step 48).

Although a transmitter and a receiver are integrated into the transmitter-receiver 1 in the above description, it is needless to say that similar effects are obtained when a transmitter and a receiver are separately provided.

As described above, according to the non-contact IC card of the present invention, since stable power is supplied from the internal battery, communication can be performed even when the IC card is away from the question unit. Thus, the non-contact IC card of the present invention is convenient. Furthermore, even when the power of the battery is exhausted, the non-contact IC card is still usable by receiving the power in electromagnetic wave from the question unit by bringing the non-contact IC card close to the question unit. Further, when the non-contact IC card is used at a location close to the question unit, an advantageous effect extending the battery life is obtained, because the power of the battery is not used.

[Second Embodiment]

Figure 4:
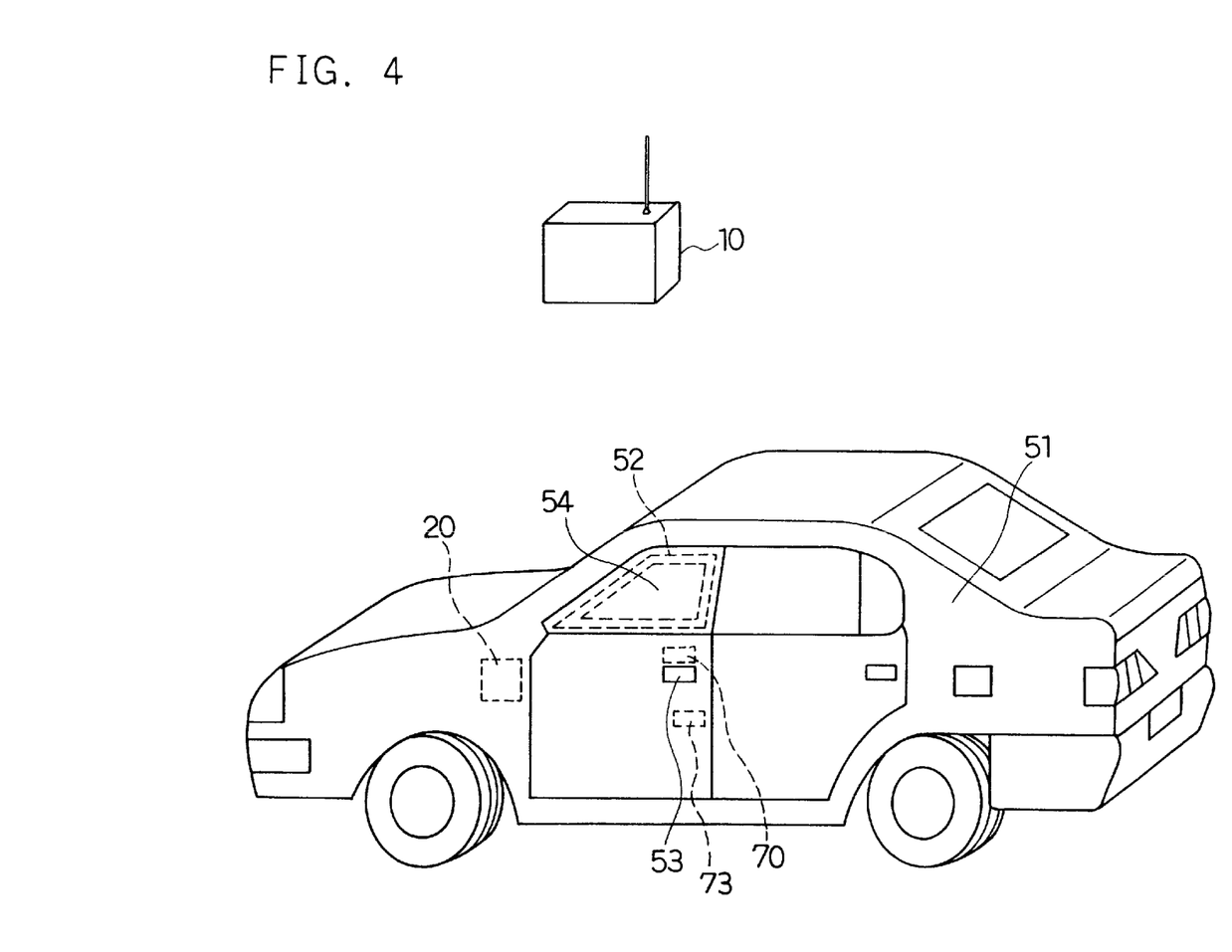
FIG. 4 is a view showing a keyless entry system for a car according to a second embodiment of the non-contact data carrier system of the present invention.

A second embodiment of the non-contact data carrier system of the present invention will be described with reference to FIG. 4 to FIG. 6. The second embodiment is an example in which the non-contact data carrier system is applied to a keyless entry system for a car. The non-contact data carrier system comprises, as shown in FIG. 4, a non-contact data carrier 10 held by the user of a vehicle 51, and a question unit 20 mounted in the vehicle 51.

The question unit 20 has a transmitter-receiver for communicating with the non-contact data carrier 10. The non-contact data carrier 10 performs data processing based on a signal transmitted by the question unit 20. The result of the processing is returned from the non-contact data carrier 10 to the question unit 20. The question unit 20 receives the returned signal and analyzes the contents of the signal to control door lock state, that is, perform door locking or unlocking. At this time, the question unit 20 performs signal transmission and reception with the non-contact data carrier 10 through an antenna 52. The configuration and the position of the antenna 52 are decided in view of the structure of the non-contact data carrier 10. It is desirable to dispose the antenna 52 in the vicinity of the perimeter of the window pane of a front door which is most frequently opened and closed by the user. The antenna 52 is formed, for example, by pasting or printing a conductive film onto the surface of the window pane.

A touch switch sensor 71 is disposed on a lever 53 for opening and closing the door, and is connected to a touch switch circuit 70 (FIG. 5) which acts as a switch for switching an operation state of the question unit 20. The touch switch sensor 71 detects when the user touches the lever 53. When the user touches the lever 3, it is determined that the user intends to lock or unlock the door, so that the question unit 20 goes into on state and transmits a signal to the non-contact data carrier 10.

Figure 5:
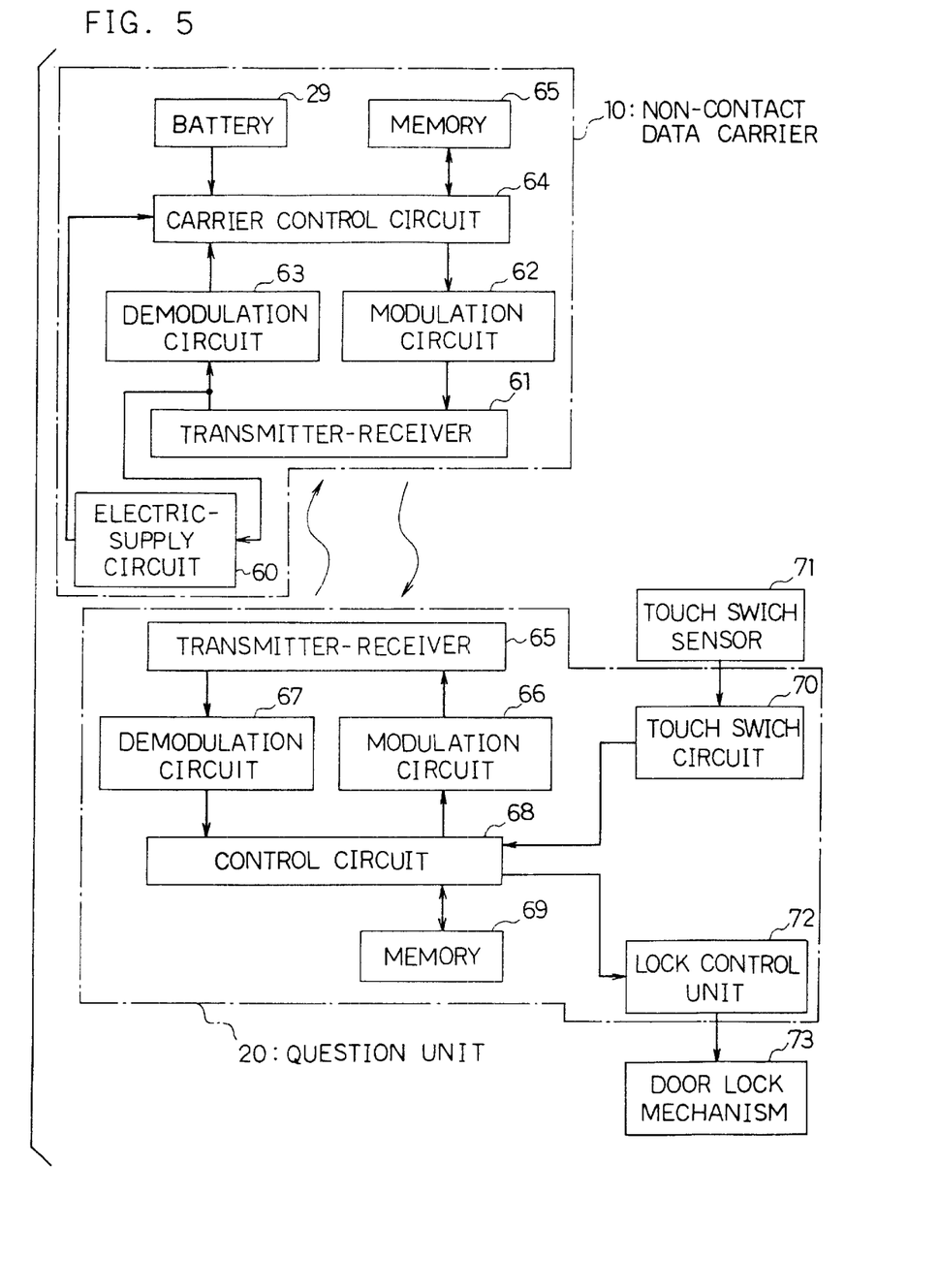
FIG. 5 is a block diagram showing the configuration of the non-contact data carrier system according to the second embodiment.

FIG. 5 is a block diagram showing the configuration of the question unit 20 and the non-contact data carrier 10.

The non-contact data carrier 10 comprises a transmitter-receiver 61 for performing signal transmission and reception with the question unit 20, a demodulation circuit 63 and a modulation circuit 62 connected to the input and output terminals of the transmitter-receiver 61 for demodulating the received signal and for modulating transmission data, respectively, a memory 65 for holding data, and a carrier control circuit 64 for controlling the circuit blocks. The non-contact data carrier 10 is formed to have a configuration suitable for carrying such as a card shape which is the same as the configuration of conventional IC cards, or a tag shape. The transmitter-receiver 61 incorporates a non-illustrated coil. An induction current is generated at the coil due to mutual induction by a radio signal transmitted from the question unit 20. The power necessary for operation of the non-contact IC card 10 is obtained from the induced current which is supplied after rectification in an electric-supply circuit 60, or from the power of the battery 29 incorporated in the non-contact data carrier 10.

When the intensity of the signal transmitted from the question unit 20 is constant, the induced current generated at the coil decreases according to increase of the distance between the non-contact data carrier 10 and the question unit 20. Therefore, in the case where the rectified induced-current of the coil is supplied as the power, communication cannot be performed when the user holding the non-contact data carrier 10 is away from the vehicle provided with the question unit 20. The non-contact IC card 10 can be used only when the user is close to the vehicle, that is, close to the antenna 52 provided at a window. Therefore, the convenience is deteriorated. On the contrary, in the case where a battery is used as the power source, a sufficient and stable power is supplied from the battery 29 to the non-contact IC card 10. Therefore the communication-possible distance increases. However, when the power storage of the battery 29 decreases and the voltage lowers, there is a possibility that the door locking operation or unlocking operation cannot be performed. In the non-contact data carrier of this embodiment, switching is made between the power obtained by rectifying the induced current of the coil and the power of the battery 29 according to their respective voltage values, and a selected power is supplied to the circuit units of the non-contact data carrier 10.

The question unit 20 receives power from the battery of the vehicle 51 and its operation condition is switched by the touch switch circuit 70 which will be described later in detail. The question unit 20 will be described with reference to FIG. 4 and FIG. 5. The question unit 20 has a transmitter-receiver 65 for performing radio signal transmission and reception with the non-contact data carrier 10. The transmitter-receiver 65 includes the antenna 52 disposed on the window pane of the vehicle 51. The input terminal of the transmitter-receiver 65 is connected to the output terminal of a modulation circuit 66 for modulating data to be transmitted to the non-contact data carrier 10. The output terminal of the transmitter-receiver 65 is connected to the input terminal of a demodulation circuit 67 for demodulating the received signal. The input terminal of the modulation circuit 66 and the output terminal of the demodulation circuit 67 are connected to a control circuit 68. To the control circuit 68, a memory 69 for holding data is further connected.

To the question unit 20, the touch switch circuit 70 is connected as switching means for switching the operation state of the question unit 20, and a lock control unit 72 is connected as lock control means for controlling a door lock mechanism 73 based on a result of communication with the non-contact data carrier 10. The touch switch circuit 70 and the lock control unit 72 are connected to the control circuit 68.

The touch switch circuit 70 is actuated when the user touches the touch sensor 71 provided at the door lever 53 of the vehicle 51. This brings the question unit 20 into operating state. That is, when the user touches the lever 53, the question unit 20 determines that the user intends to lock or unlock the door, so that a signal is transmitted from the question unit 20 to the non-contact data carrier 10. In this embodiment, only while the user is touching the lever 53, the question unit 20 is in operating state and continuously transmits a signal to the non-contact data carrier 10. When the user moves his or her hand off the lever 53, the question unit 20 stops the signal transmission to the non-contact data carrier 10 and goes into wait state. In the wait state, the question unit 20 always supplies power to the touch switch circuit 70 so that the circuit 70 can detect the user's touching of the lever 53. At this time, the signal is not transmitted to the non-contact data carrier 10, so that the power which is consumed by the non-contact data carrier system is extremely small. When the vehicle is parked, power from the car-mounted battery is supplied to the question unit 20. However, since the capacity of the battery is set to be large enough for the power consumption of the question unit 20, the battery is not adversely affected. The lock control unit 72 is connected to the door lock mechanism 73 for performing door locking or unlocking, and is controlled by the control circuit 68.

Instead of the touch switch sensor 71 and the touch switch circuit 70, a mechanical switch which operates in conjunction with the lever 53 may be provided at the door, so that when the user operates the lever 53 in order to open or close the door, the mechanical switch operates to bring the question unit 20 into operating state. Since the mechanical switch requires no electric power for operation, power consumption of the non-contact data carrier system can be reduced.

Subsequently, operation of the non-contact data carrier system of this embodiment will be described. When the user touches the lever 53 of the door, the touch switch sensor 71 provided at the lever 53 detects the user's touching of the lever 53, so that the touch switch circuit 70 goes into on state. Consequently, the question unit 20 is actuated and the control circuit 68 of the question unit 20 produces data to be transmitted to the non-contact data carrier 10. A radio signal including the data is transmitted through the modulation circuit 66 and the transmitter-receiver 65 from the antenna 52 to the non-contact data carrier 10 held by the user. The question unit 20 continues signal transmission to the non-contact data carrier 10 while the user is touching the lever 53 of the door, and stops signal transmission when the user moves his or her hand off the lever 53.

The non-contact data carrier 10 receives the radio signal from the question unit 20 and demodulates the signal at the demodulation circuit 63. The carrier control circuit 64 performs processing in accordance with the contents of the received signal and produces return data representative of a key ID particular to the non-contact data carrier 10 with reference to data stored in the memory 65. The return data are transmitted through the modulation circuit 62 and the transmitter-receiver 61 to the question unit 20 by a radio signal.

The question unit 20 analyzes the return data at the control circuit 68 and decodes the key ID stored in the non-contact data carrier 10. Then, the control circuit 68 compares the ID particular to the car having the question unit 20 and the key ID returned from the non-contact data carrier 10. When the IDs coincide with each other, an unlocking signal is transmitted to the lock control unit 72. The lock control unit 72 drives the door lock mechanism 73 to unlock the door.

When the IDs do not coincide with each other, that is, when the key ID stored in the non-contact data carrier 10 does not coincide with the ID of the car, the control circuit 68 determines that the received ID is not returned from the authorized non-contact data carrier 10. Consequently, the control circuit 68 does not transmit the unlocking signal to the lock control unit 72, so that the door maintains locked state.

Although door unlocking operation has been described in this embodiment, it is needless to say that door locking operation can be performed in a similar manner. Moreover, since not only the door but also the key cylinder of a trunk lid can be locked or unlocked simultaneously with the door locking and unlocking operation, the non-contact data carrier system of this embodiment is convenient. The user is usually situated behind the car when opening or closing the trunk lid, it is necessary to provide the antenna 52 also on a rear window.

The question unit 20 may be combined with an engine control circuit (not shown) of the car so that the start of the engine is disabled when the user does not hold the non-contact data carrier 10. According to this configuration, the non-contact data carrier system serves as an anti-theft device.

[Third Embodiment]

Figure 6:
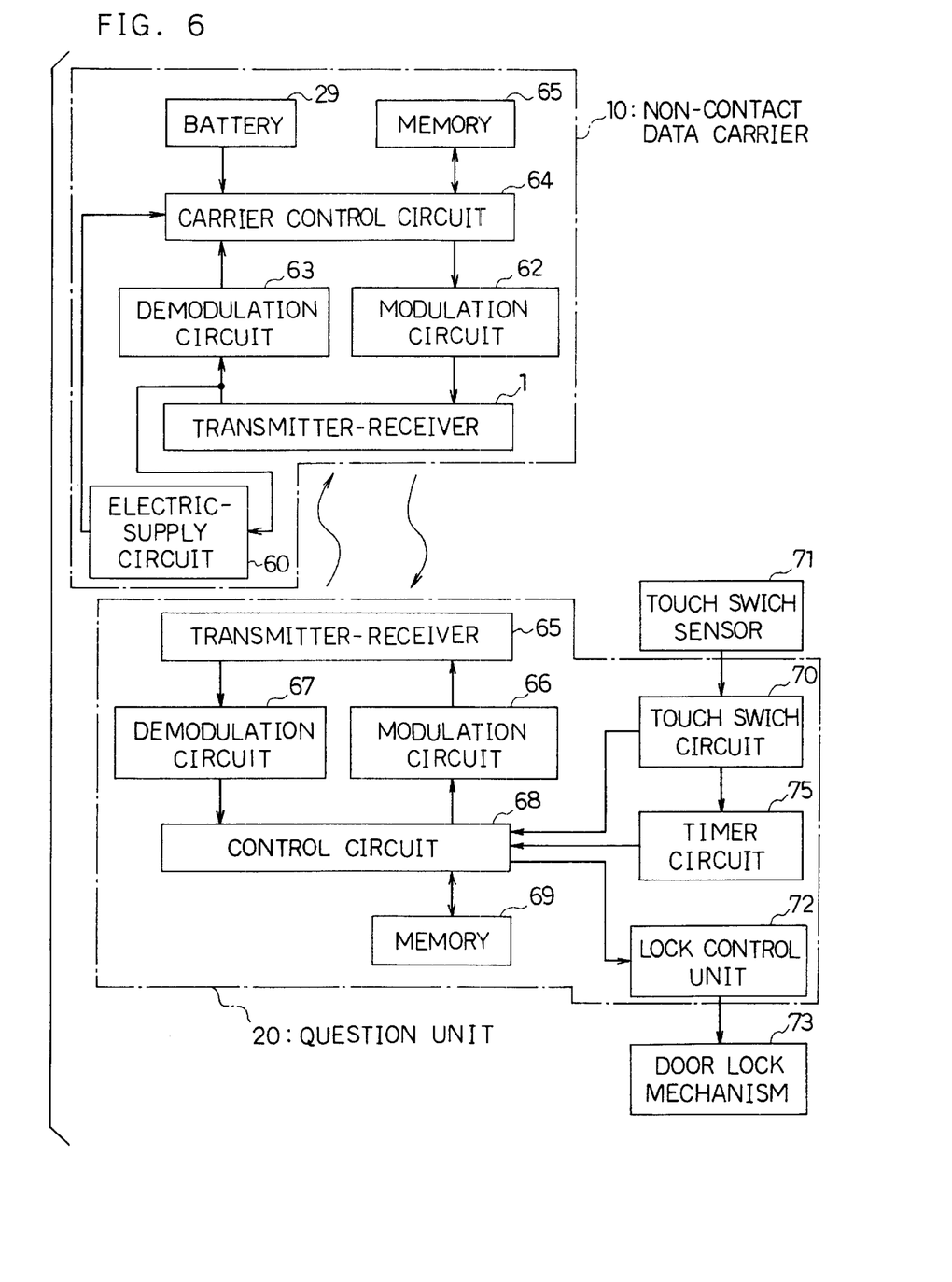
FIG. 6 is a block diagram showing the configuration of a non-contact data carrier system according to a third embodiment.

FIG. 6 is a block diagram showing a concrete example of a non-contact data carrier system according to a third embodiment of the present invention. The third embodiment is also an example in which the non-contact data carrier system is applied to the keyless entry system for a car. In FIG. 6, elements which perform similar functions as those of FIG. 5 have the same reference numerals and will not be described again. In the non-contact data carrier system of the third embodiment, a timer circuit 75 is connected between the touch switch circuit 70 and the control circuit 68.

In the question unit 20 of the configuration shown in FIG. 5, operation condition of the question unit 20 is switched by the touch switch sensor 71 provided at the lever 53 or the mechanical switch. According to this configuration, when the touch switch sensor 71 is continuously made ON state, or the mechanical switch is closed continuously, for example by mischief, the question unit 20 continues signal transmission to the non-contact data carrier 10. Consequently, there is a possibility that the power of the battery of the non-contact data carrier 10 is wasted and the battery goes dead.

In the question unit 20 of this embodiment, the time that has elapsed since turning on of the touch switch circuit 70 brought the question unit 20 into operating state (namely, operating time) is detected by the timer circuit 75. When the operating time of the question unit 20 reaches a prescribed time, the question unit 20 is forcibly changed from operating state to wait state by operation of the timer circuit 75. Consequently, even though control is performed so that the operation of the touch switch circuit 70 is continued and the question unit 20 stays in operating state, the question unit 20 goes into wait state after the prescribed time has elapsed. That is, even if the on state of the touch switch circuit 70 is continued by mischief and the like, the question unit 20 does not operate, so that signal transmission is prevented from being continued. Although the touch switch circuit 70 is used in this embodiment, similar effects are produced even when a mechanical switch is used.

A method of verifying the key ID of the non-contact data carrier system in this embodiment will be described hereafter. The touch switch circuit 70 is actuated by touch at the lever 53 of the door by the user, so that a radio signal is transmitted from the question unit 20 to the non-contact data carrier 10. In response to the signal, the non-contact data carrier 10 returns information representative of a key ID to the question unit 20. The question unit 20 analyzes the returned information at the control circuit 68. When the key ID coincides with the vehicle ID, the question unit 20 transmits a signal to the lock control unit 72, so that the door lock mechanism 73 is unlocked. When the ID of the returned information does not coincide with the vehicle ID, the signal is not transmitted to the lock control unit 72, so that the door lock mechanism 73 is not unlocked. When the user moves his or her hand off the lever 53 of the door, the question unit 20 stops signal transmission. After a predetermined time has elapsed according to counting by the timer circuit 75, the question unit 20 stops signal transmission even when the user is still touching the lever 53 of the door.

Although only unlocking operation has been described in the above description, it is needless to say that the present invention is applicable to locking operation. Moreover, the present invention is applicable to control of locking or unlocking of the trunk of the vehicle 51.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A non-contact data carrier comprising:

carrier signal detection means for detecting a carrier signal transmitted from a question unit, for comparing an amplitude level of said carrier signal with a predetermined reference level and for placing said non-contact data carrier into a sleep state on the basis of the comparison result;

a main circuit unit comprising a memory for holding data, a demodulation circuit, a modulation circuit and a control circuit;

switching means for switching output condition of power supplied from an internal battery to said main circuit unit;

electric-supply means for rectifying said carrier signal and generating a voltage; and electric-supply switching means to which an output of said electric-supply means and an output of said switching means are input, said electric-supply switching means outputting a voltage to said main circuit unit, wherein said carrier signal detection means compares the amplitude level of said carrier signal and the predetermined reference level, and when said level of said carrier signal is higher than said reference level, said switching means goes into an "ON" state so that power of said battery is supplied to said electric-supply switching means, and when said switching means is in the "ON" state, a voltage value of said battery and a value of said voltage generated by said electric-supply means are compared, and when said voltage value of said battery is higher than said voltage generated by said electric-supply means, said electric-supply switching means outputs power of said battery to said main circuit unit.

2. A non-contact data carrier comprising:

transmission-reception means for receiving a carrier signal from a question unit and for transmitting data to said question unit;

carrier signal detection means for comparing an amplitude level of the carrier signal with a predetermined level;

a demodulation circuit for demodulating the carrier signal;

a modulation circuit for modulating the data to be transmitted to said question unit, a control circuit for controlling said modulation circuit; said control circuit receiving an output of said demodulation circuit;

electric-supply means for rectifying the carrier signal and generating a voltage;

switching means for supplying power from an internal battery; and electric-supply switching means connected to said electric supply means and to said switching means for supplying power to said modulation circuit, said demodulation circuit and said control circuit, wherein said switching means provides the power from said battery to said electric-supply switching means when the amplitude level of the carrier signal is greater than the predetermined level and, if the amplitude level of the carrier signal is less than the predetermined level, the non-contact data carrier is brought into a sleep state in which the power from said battery is supplied only to said carrier signal detection means and to said switching means and wherein said electric-supply switching means includes a comparator for comparing a voltage value of said battery and a voltage value of said electric-supply means, and switches said electric-supply switching means to said electric-supply means when the voltage value of said electric-supply means is higher than the voltage value of said battery.

* * * * *